United States Patent [19]
Seiden

[11] 3,806,606
[45] Apr. 23, 1974

[54] PREPARATION OF SYNTHETIC CHEESE

[75] Inventor: Paul Seiden, Cincinnati, Ohio

[73] Assignee: The Proctor & Gamble Company, Cincinnati, Ohio

[22] Filed: Mar. 29, 1971

[21] Appl. No.: 129,241

[52] U.S. Cl. ............................ 426/188, 426/361
[51] Int. Cl. ..................................... A23c 19/02
[58] Field of Search ...................... 99/115–117, 99/118

[56] References Cited
UNITED STATES PATENTS

| | | | |
|---|---|---|---|
| 2,892,721 | 6/1959 | Nelson | 99/118 R |
| 3,459,777 | 8/1969 | Seiden | 99/118 R X |
| 3,592,661 | 7/1971 | Seiden | 99/118 R |
| 3,310,406 | 3/1967 | Webster | 99/117 X |
| 2,279,202 | 4/1942 | Musher | 99/117 |
| 1,514,780 | 11/1924 | Morton | 99/117 |
| 3,494,944 | 2/1970 | Seiden | 99/118 R |
| 2,442,535 | 6/1948 | Eckey | 99/118 R |

OTHER PUBLICATIONS

Davis, J. G., Cheese, American Elsevier Publ. Co. Inc., N.Y., Vol. I, 1965 (pp. 290–292)

*Primary Examiner*—David M. Naff

[57] ABSTRACT

A synthetic cheese having the characteristic texture and eating quality of natural dairy cheese. The synthetic cheese comprises from 10 percent to 40 percent by weight of a narrow melting range fat which has an SCI of less than 3 at 92°F and an SCI of from 15 to 25 at 70°F, from 10 percent to 25 percent by weight of wheat gluten, from 3 percent to 6 percent by weight of egg white, and from 3 percent to 6 percent by weight of gelatin. The remaining portion comprises water, salt, and cheese flavor minors.

13 Claims, No Drawings

3,806,606

PREPARATION OF SYNTHETIC CHEESE

BACKGROUND OF THE INVENTION

Natural dairy cheese has certain characteristics which are commonly identified with cheese products. The more important of these characteristics are texture and eating quality. The characteristic texture and eating qualities of dairy cheese are the uniform consistency at lower than body temperatures, the elastic, chewy, mouth-eating quality, and the fact that while cheese is of uniform consistency at lower than body temperatures, the fat content of cheese rapidly melts at mouth temperatures to provide a flavor and cooling sensation. Since cheese has unique textural and eating qualities, including the elastic eating quality as well as the melt-in-the-mouth eating quality, it follows that synthetic cheese products to be successful simulations, must have the same texture and eating qualities as natural dairy cheese. Heretofore, while the appearance of natural dairy cheese has been successfully duplicated, most attempts at successfully duplicating the texture and eating quality of natural dairy cheese have been unsuccessful.

It has now been found that a particular combination of narrow melting range fats and wheat gluten as well as egg white and gelatin can provide a product which has the texture, appearance, and eating quality of natural dairy cheese.

The object of this invention is to achieve a synthetic cheese product having the texture, eating quality, and appearance of natural dairy cheeses.

SUMMARY OF THE INVENTION

This invention relates to a synthetic cheese product having the texture, appearance, and eating quality of natural dairy cheese. The products simulates the chewy texture and eating quality of cheese as well as the uniform consistency of cheese at lower temperatures, and the rapid melt-in-the-mouth and cooling sensation achieved at mouth eating temperatures. These typical characteristics of natural dairy cheese are achieved by providing a composition which comprises from 10 percent to 40 percent by weight of a specific narrow melting range fat ingredient, from 10 percent to 25 percent by weight of wheat gluten, from 3 percent to 6 percent by weight of egg white, from 3 percent to 6 percent by weight of gelatin, and the remainder comprising water, flavoring, salt, and, if desired, other minors such as food colorings and the like.

DETAILED DESCRIPTION OF THE INVENTION

The total composition of the synthetic cheeses of this invention is as follows:

| Ingredient | Percent By Weight |
|---|---|
| Narrow melting range fat | 10–40 |
| Wheat gluten | 10–25 |
| Egg white | 3–6 |
| Gelatin | 3–6 |
| Water, flavoring, coloring, and other minors, if any | Balance |

The essential ingredients in forming a synthetic cheese product having the texture, appearance, and eating quality of natural dairy cheese are the narrow melting range fats, the wheat gluten, the egg white, and the gelatin. The combination of each of these ingredients in the above specified percentage ranges allows the formulation of a synthetic cheese, or a cheese analog, the two terms being used interchangeably herein, which closely resembles natural dairy cheese in terms of texture, appearance, and eating quality; more specifically, the cheese analog closely resembles the natural elastic chewy nature of dairy cheese, the uniform consistency of dairy cheese at ambient conditions, and the melt-in-the-mouth quality of dairy cheese at mouth temperatures.

In order to provide a natural cheese uniform consistency at ambient temperatures, i.e., 50° to 70°F, coupled with the ability to rapidly melt in the mouth at mouth temperatures, i.e., 92°F, it is essential that the fat portion of the synthetic cheese composition comprise a narrow melting range fat having an SCI (solids content index) of less than 3 at 92°F, and an SCI of from 15 to 25 at 70°F.

The solids content referred to hereinabove is expressed in the fats and oils art in terms of the "solids content index", i.e., SCI value. The SCI value is measured by what is essentially the test described in the Journal of the Americal Oil Chemists Society, March 1954, Vol. 31, pages 98–103. The test involves a dilatometric measurement of the amount by which a fat expands when heated from a specific temperature to complete melting. Since this expansion is due to both volume increase when solids change to liquids without a temperature change and a volume increase due to thermal expansion wihtout change in phase from solid to liquid, allowance is made for the thermal expansion so that the change in volume gives a measurement of the amount of solids present at the temperature of measurement.

SCI data for oils and fats are usually presented in the form of a curve or graph in which the SCI is plotted against temperature. A flat SCI curve is undesirable for the fats utilized in this invention, since it is necessary to have fat compositions which remain high in solids content over a wide range of temperatures and abruptly melt within a narrow range of temperatures which approach mouth temperature. Therefore, a "bent" SCI curve, and particularly one that is rapidly sloping between 80° and 92°F, is highly desirable for the narrow melting range fat compositions used in making synthetic cheeses. Such narrow melting range fats provide the desired quality of stability at ambient conditions, and rapidly melt at mouth eating temperatures to give a sensation of cooling and flavor simultaneously. Narrow melting range fats, especially suitable for this invention, and therefore preferred, have an SCI of less than 1 at 92°F.

The most preferred narrow melting range fats are those described in two of my previous patents. The first of these is derived from short chain and notably lauric triglycerides, and it is described in my previous patent, Seiden, U. S. Pat. No. 3,592,661, Ser. No. 760,061, filed Sept. 16, 1968, issued July 13, 1971. In that patent, I described the formulation of margarine oils comprising from 60 percent to 80 percent of a soft oil component, and from 20 percent to 40 percent of an intermediate melting randomly esterified triglyceride component. Preferred oils comprise from 70 percent to 78 percent of the soft oil component, and from 22 percent to about 30 percent of the randomly esterified triglyceride component. The two components are preferably present together in a physical blend to provide the suitable narrow melting range fat for use in my present invention.

The soft oil component can be any normally liquid glyceride oil or oil fraction. Suitably soft oil glycerides can be derived from animal, vegetable, or marine sources, including naturally occurring triglyceride oils and fats such as cottonseed oil, soybean oil, peanut oil, rapeseed oil, palm oil, corn oil, crambe oil, sunflower seed oil, safflower seed oil, lard, tallow, marine oils, and the like.

It is desirable that the soft oil component be refined and bleached in accord with conventional practice. See, for example, Bailey's Industrual Oil and Fat Products, 3rd Edition, pages 719 et seq.

The intermediate melting triglyceride components must be randomly esterified and have a fatty acid composition comprising from 87 percent to 97 percent saturated $C_{12}$ (lauric acid), and from about 3 percent to about 13 percent saturated $C_{16}$–$C_{18}$ (palmitic acid, stearic acid, and mixtures thereof). Since technical grades of lauric, palmitic, and stearic acid are often conveniently used, the fatty acid composition of this intermediate triglyceride melting component can contain up to about 6 percent total of myristic, caprylic, and caproic acid. The intermediate melting triglyceride component is preferably substantially free from $C_{20}$ or higher fatty acid. A preferred fatty acid composition comprises from 90 percent to 97 percent saturated $C_{12}$, and from about 3 percent to about 10 percent saturated $C_{16}$.

Random esterification of the intermediate melting triglyceride with this specified fatty acid is an essential part of the formulation of the narrow melting range fat presently being described. Mere physical blends, for example, of 94 percent trilaurin and 6 percent tripalmitin, do not provide narrow melting range fats having the desired bent SCI curve. However, the narrow melting range fat can of course contain over tricglycerides in physical combination with the required randomly esterified triglyceride. Also, two separately randomly esterified intermediate melting triglyceride components can be used in physical combination.

The intermediate melting triglyceride component can be readily prepared by conventional random trans esterification, interesterification, or rearrangement reactions between, for example, trilaurin and tripalmitin, or trilaurin and palmitic acid. See, Bailey's page 946–965. A suitable method for preparing a random triglyceride of proper fatty acid content is to interesterify trialuring with tripalmitin and/or tristearin according to the process of Burgess et al. as disclosed in U. S. Pat. No. 3,170,798, Feb. 23, 1965. A very desirable material for use as the intermediate melting triglyceride component is commercially available technical grade trilaurin which is randomly esterified and has a fatty acid composition of about 95.4 percent $C_{12}$, 3.4 percent $C_{16}$, and 1 percent $C_{10}$.

A second preferred narrow melting range fat composition for use in preparing the synthetic cheeses of this invention comprises from 50 percent to 80 percent of the soft oil previously described herein, and from 20 percent to 50 percent of an intermediate melting point component having a fatty acid composition comprising at least 60 percent $C_{16}$–$C_{18}$ trans unsaturated fatty acid groups. Suitable means for preparation of this second preferred component are described in my previous U.S. Pat. No. 3,459,777, patented Aug. 5, 1969. In that patent a process of partial and selective catalytic hydrogenation of certain glycerides is specified to give a resulting hydrogenated oil which is substantially higher in trans acid content than can be achieved with conventional hydrogenation. These fats after treatment in accord with the selective hydrogenation process described in that patent are of uniform consistency at from 50° to 70°and rapid melting at from 80° to 92°F, and thus meet the requirements for use in this invention. Briefly, in accord with the process of selective hydrogenation described therein, catalytic hydrogenation of vegetable and marine oils is provided at temperatures in the range of from 180°C to about 240°C at a pressure in the range of from 0 psig to about 100 psig. The catalyst is added at the beginning of the hydrogenation reaction in an amount sufficient only to start the reaction. Subsequently, incremental additions of catalyst are made, the additions being not less than two in number for each 6.5 unit decrease in refractive index, at a frequency such that the hydrogenation reaction follows a predetermined substantially straight refractive index/time curve. The reaction is terminated before the I.V. of the partially hydrogenated oil decreases to 60. When using this process of incremental addition of catalyst under the carefully controlled conditions specified in my previous patent, the result is an intermediate melting point component which has a fatty acid composition comprising at least 60 percent $C_{16}$–$C_{18}$ trans unsaturated fatty acid groups. Providing this intermediate melting point component which is subsequently mixed with the soft oil specified above in the ranges specified above will give a narrow melting range fat composition having the SCI requirements especially suitable for use in the synthetic cheese formulations of this invention.

In order to provide the proper texture and appearance as well as the eating quality of natural dairy cheese, it is essential that the narrow melting range fat comprise from 10 percent to 40 percent by weight of the total synthetic cheese composition. Preferably it comprises from 15 percent to 30 percent by weight of the total cheese composition. Providing an amount of narrow melting range fat of at least 10 percent is essential to provide simulation of the eating quality of natural dairy cheese and, if amounts of greater than 40 percent are employed, the cheese mixture becomes too high in fat and oil content to simulate natural dairy cheese.

The second essential component comprises from 10 percent to 25 percent by weight of the toal cheese composition of wheat gluten. Wheat gluten is well known and comprises an extracted protein portion obtained from wheat flour. While wheat gluten extracted from wheat flour is well known, it is generally extracted by forming a dough from wheat flour and subsequently water-washing while simultaneously working the dough. During the water-washing the starch is removed and a residue of sticky protein, referred to as wheat gluten, remains behind It has been found that wheat gluten is essential to the synthetic cheese of this invention in order to provide the typical elastic eating quality of natural dairy cheese. Amounts of wheat gluten less than 10 percent by weight of the synthetic cheese formulation are insufficient to provide typical cheese eating quality and amounts greater than 25 percent provide an excessive amount of stickiness and elastic chewing quality. Preferred amounts are from 15 percent to 20 percent by weight of the cheese formulation.

The third essential component comprises from 3 percent to 6 percent by weight of the cheese formulation of egg white and/or egg albumen, the two terms being utilized herein interchangeably. The egg white is essential in aiding the formation of an initial emulsion, and as explained hereinafter in more detail, contributes to the heat setting aspects of the emulsion which must be accomplished in order to provide a stable cheese formulation.

The final essential ingredient is a suitable gelatin at a level of from 3 percent to 6 percent by weight of the total emulsion. The gelatin contributes to the elastic mouth eating quality typical of natural dairy cheese and, in addition, provides a characteristic fineness of texture of natural dairy cheese. No criticality exists with regard to the exact source of gelatin, and suitable gelatin can be obtained from the usual animal material sources, i.e., bones, skin, ligaments, tendons, and the like. Agar agar which is often used as a gelatin substitute can also be effectively utilized.

The remaining portion of the cheese formulation comprises water, cheese flavoring, coloring, salt, and other minors if desired.

In regard to the exact amount of water employed in the formulation, no criticality exists and the precise amount of water utilized is determined by the texture of the ultimate cheese product to be simulated. For example, if cream cheeses are to be simulated the amount of water employed will be of a igher percentage than if more nearly dry cheese products such as cheddar cheese are to be simulated. In any event, as long as the other ingredients are utilized in the amount specified herein the amount of added water, which is the balance necessary to make the desired total weight of synthetic cheese, will provide a simulated cheese product.

Turning now to the process of making the synthetic cheese from the formulation.

In the first step, a blend is prepared of the narrow melting range fat, the wheat gluten, the egg white, gelatin, minors such as salt, cheese flavoring, and the like, and of course, water.

After preparation of the blend as explained above, the blend is homogenized in any suitable mixing device to provide a uniform homogenized composition. No criticality exists with regard to the exact sort of mixing device utilized and conventional devices such as Manton-Gaulin homogenizers, Waring blenders, high shear mixers, omnimixers, and other well known mixing devices can be employed. Homogenization is continued until the entire mixture becomes a uniform batter. Of course the exact time of homogenization will depend upon the viscosity of the batter which in turn depends upon the precise percentage selected within the ranges set forth herein. However, a convenient measure for completeness of homogenization, is that homogenization is complete when the appearance of the blend changes from a low viscosity mixture containing fat droplets to a homogenized continuous one phase-type mixture having a high sheen. In every instance it has been found that upon complete homogenization the appearance changes from a dull looking whitish color to the development of a yellowish white high sheen surface. Generally, homogenization is completed in from 5 minutes to one hour with from 5 minutes to 30 minutes being sufficient to complete homogenization in most instances.

Preferably, in order to insure complete dispersion of the narrow melting range fat, the narrow melting range fat is melted either before placement in the blend or alternatively by heating the blend during homogenization. Since the narrow melting range fat is specifically formulated to melt at temperatures of about 92°F, it has been found that temperatures in the range of from 100° to 120°F are always sufficient to provide the narrow melting range fat in liquid form. While blending and homogenization can occur without utilization of melted narrow melting range fat, it has been found that dispersion is substantially more effective in the event that liquid fat is employed.

The final step in the process of this invention comprises heat setting the homogenized composition preferably at temperatures from 140°F to 260°F for a time of at least 10 minutes, and preferably from 10 minutes to one hour or longer, depending upon the size of batch being employed.

No precise criticality exists with regard to the heat setting temperature as long as that temperature is above the heat coagulation temperature of wheat gluten and egg white. Generally, this temperature is about 140°F.

During the heat setting step, the wheat gluten as well as the egg white are heat coagulated to contribute to the elastic eating quality characteristics of natural dairy cheese. In addition, the gelatin, gelatinizes and contributes a fineness of texture as well as a uniform consistency appearance in the resulting heat set composition. The heat setting step is essential in order to provide the typical elastic eating quality and texture of natural cheese, for if it is not employed, the composition will be of low viscosity and not cheese-like in character.

The following Example is offered to illustrate the process and product of this invention.

EXAMPLE

A blend comprising the following composition was prepared:

| Ingredient | Amount | % By Weight |
|---|---|---|
| Wheat gluten | 300 g. | 14.2 |
| *Narrow melting range fat | 600 g. | 28.5 |
| Egg white | 100 g. | 4.7 |
| Gelatin | 100 g. | 4.7 |
| Water | 1000 g. | 47.7 |
| Salt | 6 g. | 0.2 |
| Coloring | 8 drops | — |

*The narrow melting range fat comprised 60% of a base soft oil which was soybean oil hardened to an IV of 108. 40% of the narrow melting range fat composition comprised an intermediate melting point randomly esterified component having a fatty acid composition comprising 90% saturated $C_{12}$ and 10% saturated $C_{16}$.

THe above listed ingredients were blended in a Hobart mixer for 10 minutes and then placed in a Waring blender and homogenized until the appearance changed from that of a low viscosity mixture containing fat droplets to a uniform homogenized composition of whitish yellow color having a high surface sheen; this was approximately 15 minutes. Homogenization was conducted at a temperature of 120°F. Thereafter the homogenized blend was heat set by placing the blend in an oven at 200°F for one hour. After one hour the product was removed and examined to determine its texture, eating quality, and appearance. The product had the appearance of a natural dairy cream cheese product, and was noted to have the characteristic elastic texture and chewiness of natural dairy cheese. In addition, upon placing the synthetic cheese product in the mouth it was noted to create a cooling sensation and to simulate the natural melt-in-the-mouth quality of dairy cheese.

When in the above example the narrow melting range fat is removed and a fat comprising 70 percent soft oil and 30 percent of an intermediate melting point component having a fatty acid composition comprising 66 percent $C_{16}$–$C_{18}$ trans unsaturated fatty acid groups, substantially similar results in terms of texture, eating quality, and melt-in-the-mouth quality as well as appearance are obtained.

The narrow melting range fats employed in this example were tested to determine their solids context index, and it was found that in both instances the SCI was less than 1 at 92°F, and at 70°F was 20.

What is claimed is:

1. A synthetic cheese having the texture and eating quality of natural dairy cheese comprising from 10 percent to 40 percent by weight of narrow melting range fat, said fat having an SCI of less than 3 at 92°F and an SCI of from 15 to 25 at 70°F; from 10 percent to 25 percent by weight of heat set wheat gluten; from 3 percent to 6 percent by weight of heat set egg white, from 3 percent to 6 percent by weight of gelatin, and water in sufficient amount to provide said texture and eating quality.

2. The product of claim 1 wherein said fat has an SCI of less than 1 at 92°F.

3. The product of claim 1 wherein the narrow melting range fat comprises from 50 percent to 80 percent soft oil and from 20 percent to 50 percent of an intermediate melting point component having a fatty acid composition comprising at least 60 percent $C_{16}$ to $C_{18}$ trans unsaturated fatty acid groups.

4. The product of claim 1 wherein the narrow melting range fat is a fat comprising from 60 percent to 80 percent of a soft oil and from 20 percent to 40 percent of an intermediate melting point randomly esterified component having a fatty acid composition comprising from 87 percent –97 percent saturated $C_{12}$ and from 3 percent to 13 percent saturated $C_{16}$ to $C_{18}$.

5. The product of claim 4 wherein the intermediate melting point randomly esterified component comprises from 90 percent –97 percent saturated $C_{12}$ and 3 percent to 10 percent saturated $C_{16}$.

6. The product of claim 4 wherein the soft oil comprises 70 percent –78 percent of the narrow melting range fat and the intermediate melting point randomly esterified component comprises from 22 percent –30 percent of said fat.

7. The product of claim 1 wherein the narrow melting range fat comprises from 15 percent to 30 percent of said cheese.

8. The product of claim 1 wherein the wheat gluten comprises from 15 percent to 20 percent of said cheese.

9. The product of claim 1 wherein additional ingredients comprise, salt, cheese flavoring, and other minors.

10. A process of making a synthetic cheese having the texture and eating quality of natural dairy cheese comprising; homogenizing a composition comprising from 10 percent to 40 percent of a narrow melting range fat having an SCI of less than 3 at 92°F and an SCI of from 15 to 20 at 70°F, from 10 percent to 25 percent of wheat gluten, from 3 percent to 6 percent of egg white, from 3 percent to 6 gelatin, flavor and water in sufficient amount to provide said texture and eating quality; and heat setting said composition.

11. The process of claim 10 wherein homogenization is continued until the composition suddenly changes in appearance from a low viscosity mixture containing fat droplets to a uniform mixture of high sheen.

12. The process of claim 11 wherein homogenization is conducted for from 5 minutes to 30 minutes at a temperature of from 100°F to 120°F.

13. The process of claim 10 wherein heat setting is conducted at a temperature of from 140°F to 260°F for at least 10 minutes.

* * * * *